United States Patent [19]
LeBaron

[11] Patent Number: 6,050,774
[45] Date of Patent: Apr. 18, 2000

[54] MODULAR FILTER FAN UNIT

[75] Inventor: James F. LeBaron, Portland, Oreg.

[73] Assignee: Huntair Inc., Tigard, Oreg.

[21] Appl. No.: 09/172,945

[22] Filed: Oct. 14, 1998

Related U.S. Application Data

[60] Provisional application No. 60/062,091, Oct. 14, 1997.

[51] Int. Cl.[7] .................................................. B01D 46/00
[52] U.S. Cl. ................................. 415/121.2; 415/169.1; 415/213.1; 415/214.1; 416/247 R; 454/187; 417/313; 417/326; 417/423.14; 417/423.1
[58] Field of Search ............................. 415/121.2, 169.1, 415/213.1, 214.1; 416/247 R; 454/187; 417/313, 326, 423.14, 423.1

[56] References Cited

U.S. PATENT DOCUMENTS

| | | |
|---|---|---|
| 4,427,427 | 1/1984 | DeVecchi . |
| 4,560,395 | 12/1985 | Davis ........................................ 55/276 |
| 4,790,863 | 12/1988 | Nobiraki et al. .......................... 55/276 |
| 4,846,859 | 7/1989 | Nobiraki . |
| 5,053,065 | 10/1991 | Garay . |
| 5,192,343 | 3/1993 | Henry . |
| 5,195,922 | 3/1993 | Genco . |
| 5,316,560 | 5/1994 | Krone-Schmidt et al. ............ 55/385.2 |
| 5,431,599 | 7/1995 | Genco . |
| 5,462,484 | 10/1995 | Jung . |
| 5,464,320 | 11/1995 | Finney ..................................... 415/60 |
| 5,496,389 | 3/1996 | Wilcox . |
| 5,586,861 | 12/1996 | Berger . |
| 5,626,820 | 5/1997 | Kinkead . |
| 5,643,077 | 7/1997 | Ayer ......................................... 454/54 |
| 5,803,721 | 9/1998 | Lee ..................................... 417/423.14 |

Primary Examiner—Edward K. Look
Assistant Examiner—Matthew T. Shanley
Attorney, Agent, or Firm—Miller Nash LLP

[57] ABSTRACT

A modular fan filter unit designed to supply process control air to mini-enclosure clean rooms. The modular fan filter unit is easy to remove, repair, and replace in the clean room environment. It has a readily accessible filter mounted across its bottom surface and an internal variable frequency drive fan. The fan pushes air through the filter into a clean room. Multiple numbers of modular fan filter units may be connected together as an array.

14 Claims, 2 Drawing Sheets

MODULAR FILTER FAN UNIT

This application claims the benefit of U.S. Provisional Application Ser. No. 60/062,091, filed Oct. 14, 1997, for a Modular Filter Fan Unit.

TECHNICAL FIELD

This invention generally relates to filtration fan units. More specifically, the invention relates to filtration fan units for clean rooms in semiconductor manufacturing facilities.

BACKGROUND INFORMATION

Many manufacturing operations take place in small clean room enclosures ("mini-enclosures"). This is particularly true at semiconductor manufacturing facilities. In these facilities, the mini-enclosures require the supply of ultra-clean air at flow rates that are uniform and controlled with a high degree of precision. Because different chip manufacturing processes take place within mini-enclosures, the size, shape, number, and location of mini-enclosures within a given facility can vary. What this means is that the air delivery systems for one or all enclosures within the facility is customized for each enclosure. Customization generally means that the air delivery system will have differences in ductwork, fan size, and filter size from one enclosure to the next. Nevertheless, all of the air delivery systems have the same fundamental mode of operation in at least one respect: all utilize a fan that drives air into the enclosure, and, the air is driven through a filter before it passes into the manufacturing space inside the enclosure.

The common practice is to design the air delivery system to match the requirements of the manufacturing operation within the enclosure. This practice creates problems when the operation within the enclosure changes or the enclosure is used for a completely different operation, because the original specifications of the air delivery system do not meet the requirements of the new situation.

Another problem with the practice described above relates to maintenance. After a period of use, the filter becomes clogged with particulate matter and needs to be replaced. Fan maintenance is required from time-to-time. In either situation, the manufacturing operation inside the enclosure has to be shut down. It would be preferable to minimize or eliminate the shut down time so that processing will be interrupted as little as possible.

For the above reasons, there is a need to create a generic form of mini-enclosure air delivery system that is easy to configure and adapt to the various kinds of enclosures used. Moreover, there is a need to develop air delivery systems that can be maintained with minimal impact on production. As will be seen, the present invention provides a solution to these problems.

SUMMARY OF THE INVENTION

The invention is a modular fan filter unit that is designed to be used for supplying process control air to mini-enclosures in semiconductor manufacturing facilities.

The components of the modular fan filter are summarized as follows: The unit includes a housing for the various components making up the unit. Most of the housing's bottom surface is open. A removable filter closes the opening. A fan drives air through the unit. The fan is mounted to a support inside the housing in a manner such that the fan is positioned above the approximate midpoint of the filter. A conventional power supply and control unit provides electrical power for driving the fan. However, the power units of individual modular units can be daisy-chained together in an array so that multiple numbers of modular units can operate together at the same time.

The fan support described above bridges the span of the filter in a manner so that, other than the fan itself, there are no significant obstructions between the fan support and the top surface of the filter. When viewed from the side, the fan support has a horizontal section that is centrally located over the approximate midspan of the filter. Side supports slope or slant downwardly and outwardly from each side of the horizontal section. They cooperate to define a divergent chamber from the horizontal section to the filter.

The fan is mounted to the bottom surface of the horizontal section. The horizontal section has a cone-shaped inlet opening for allowing the fan to draw air from a region above the fan support. The air cone inlet flares symmetrically outwardly from bottom to top. The top of the cone is spaced a distance below the top surface of the housing.

The housing's top surface has a plurality of openings or vents for allowing air to enter the unit and be drawn through the air cone into the fan. There is preferably a variable frequency drive ("VFD") controlled fan and is designed to force air radially outwardly against the side supports of the fan supports. This serves to spread the force of the fan-driven airflow across the filter as air pressure buildup drives the air through the filter.

The power supply and control unit (collectively "power distribution box") delivers power to the fan. The power distribution box also allows control signals to be directed to the variable frequency drive to control the fan speed. The variable frequency drive allows fan speed to be set and adjusted with very precise control. As mentioned above, the power distribution box also allows multiple numbers of modular fan units to be connected together in series depending on the airflow requirements of the particular clean room configuration in which the invention is used.

The invention, as summarized above, will become better understood upon reading the following description which is to be read in conjunction with the accompanying drawings.

BRIEF DESCRIPTION OF THE DRAWINGS

In the drawings, like reference numerals and letters refer to like parts throughout the various views, and wherein.

BEST MODE FOR CARRYING OUT THE INVENTION

Figure 1:
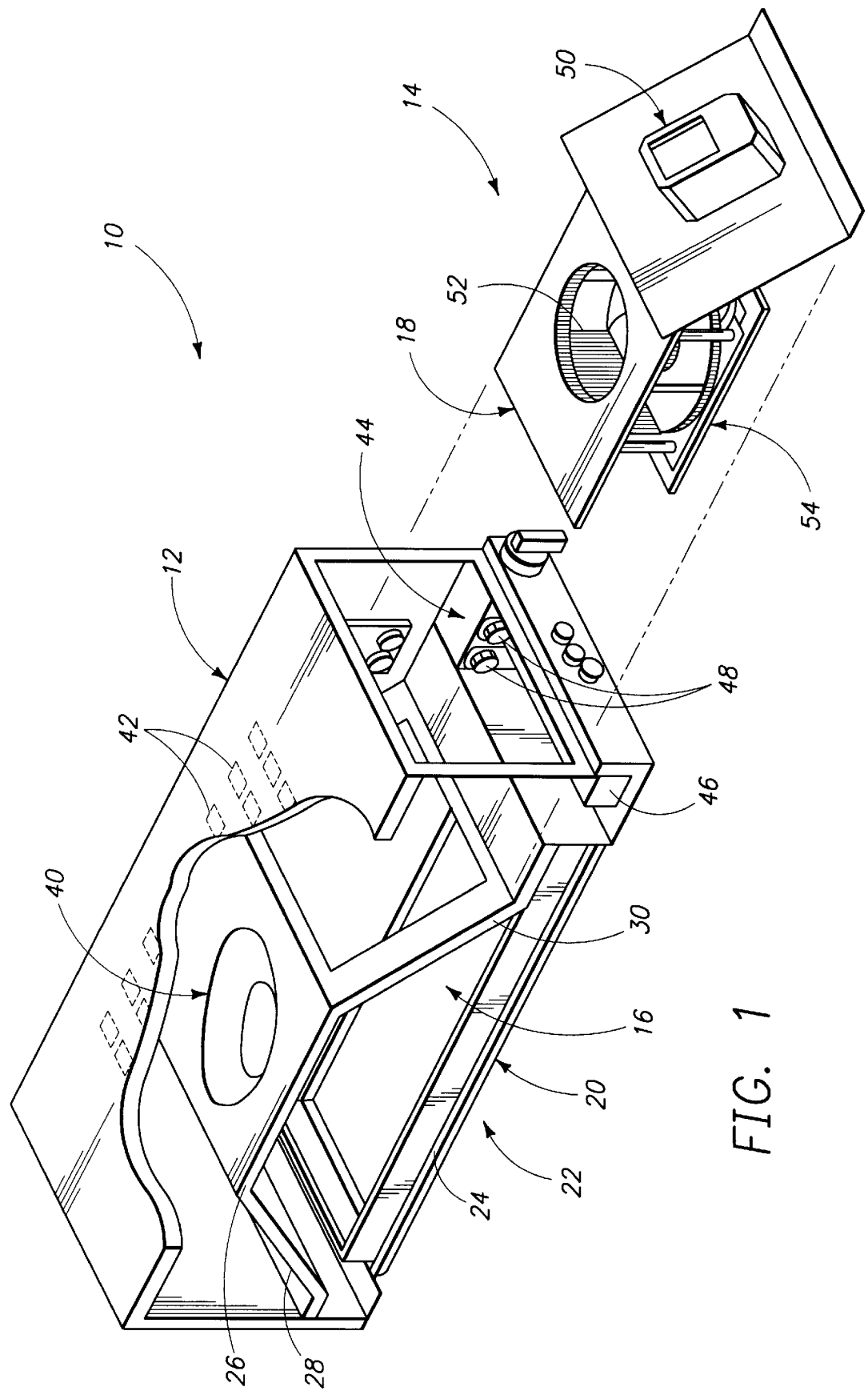
FIG. 1 is an exploded view of the modular fan filter unit.
Figure 2:
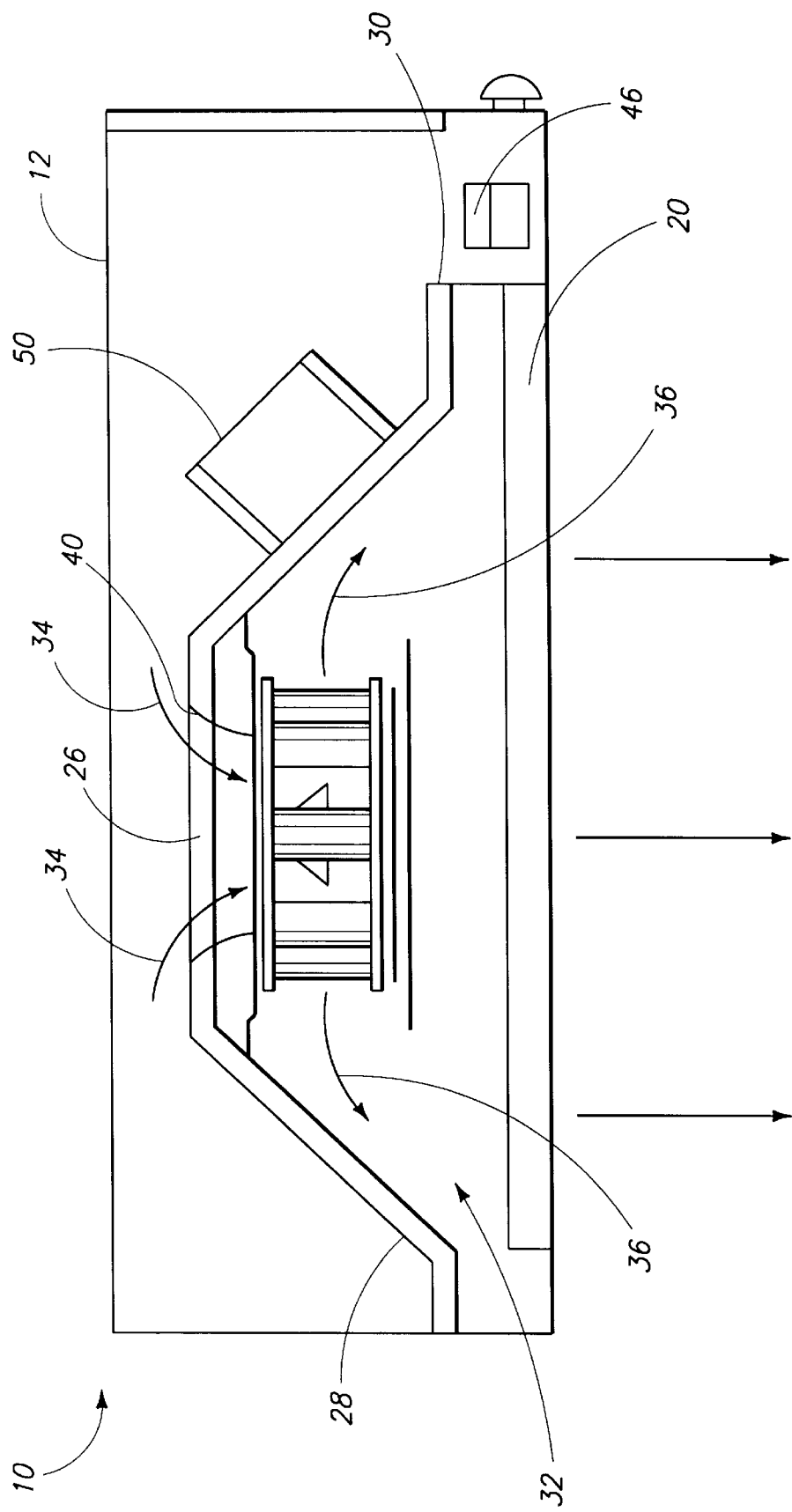
FIG. 2 is a sectional view of the modular fan filter unit shown in FIG. 1.

Referring now to FIGS. 1 and 2 of the drawings, shown generally at 10 is a modular fan filter unit constructed in accordance with a preferred embodiment of the invention. The modular fan filter unit 10 has a housing 12 and a fan assembly 14 inside the housing 12. The housing 12 is made of metal. The fan assembly 14 is mounted to a support 16 in the housing 12. The fan 18 draws air from the ambient surroundings and pushes it through a filter 20. The fan 18 is positioned above the approximate midpoint of the filter 20. The filter 20 is preferably a PTFE membrane filter. The bottom of the housing, indicated at 22, would be open but for the filter 20. The filter 20 is mounted to the housing 12 by suitable brackets 24.

The fan support 16 bridges the span of the filter 20 (e.g., over the bottom opening 22 of the housing 12) such that no significant obstructions exist between the fan assembly 14 and the top surface of the filter 20. When viewed from the side (see FIG. 2), the support 16 has a horizontal section 26 that is centrally located over the approximate midspan of the filter 20. The fan assembly 14 is mounted to the bottom surface of the horizontal section 26 in a manner that will be described later. The fan support 16 also has side supports 28 and 30, which slope or slant downwardly and outwardly from each side of the horizontal section 26. They cooperate to define a divergent chamber 32 from the horizontal section 26 to the filter 20.

The housing 12 is constructed so that it creates a low pressure region, shown by the arrows 34, and a high pressure region, shown by the arrows 36, when the modular fan filter unit 10 is in operation. The horizontal section 26 has an inlet opening 40 for allowing the fan 18 to draw air from the low pressure region 34 above the fan support 16. The inlet opening 40 is a cone-shaped duct for guiding air into the fan 18 through the fan support 16. The cone inlet 40 preferably flares symmetrically outwardly from bottom to top. The top of the cone 40 is spaced a distance below the top surface of the housing 12. The top surface of the housing 12 has a plurality of openings or vents 42 for allowing air to enter the unit and be drawn through the cone 40 into the fan assembly 14.

The air flow from the high pressure region 36 passes through the filter 20 to provide ultra clean air to the work space. The filter 20 is preferably fastened to the underside of the housing 12, to allow removal of the filter without having to remove or move the entire unit 10.

As mentioned above, the unit 10 is "modular." A power distribution box 44 is provided to distribute power and provide connections for control signals. The power distribution box 44 includes a connection box 46 having at least one conventional outlet connection. Preferably, however, multiple connections 48 can be provided in the same box. For example, three quick connections 48 can easily be provided. The first connection is provided for input power from the facility. The second connection provides power to the fan assembly 14 within the module itself The third connection provides a power outlet to another modular fan filter unit. The third connection enables multiple units to be connected together in electrically parallel fashion to the same power source. The connections 48 are arranged so that one may disconnect the power to one fan assembly 14 without affecting power supplied to the other modular fan filter units 10. Connections can easily be made to many modules at the same time from a single facility power supply. The connections described would be easy to implement by a skilled person, as they are conventional.

Similarly, in a preferred embodiment, the power distribution box 44 provides standard connections to provide control signals to each of the modular fan filter units 10. The control signal can be directed to a VFD control 50 for the fan 18 within a given unit 10. These types of connections are well understood and can be obtained from any number of sources.

The VFD control 50 provides a constant intake of air by controlling the speed of a motorized impeller 52 in the fan assembly 14. As a skilled person would know, this type of VFD control 50 is able to maintain fan speed independent of facility electrical fluctuations, so that a consistent fan speed is maintained. By maintaining a consistent fan speed it is possible to produce a consistent volumetric flow rate.

As discussed above, the power distribution box 44 can provide a control signal to the VFD control 50. In this way an external control signal can be provided to each modular unit 10 to precisely adjust the volumetric flow rate from each modular unit. Alternatively, the VFD control 50 can be preset to maintain a consistent flow rate without variation. It is also possible to set up a local control system integrated with the VFD control 50 to adjust the local flow rate within a given region.

The fan assembly 14 is preferably a removable and replaceable fan assembly, commonly referred to as a "plug fan." The fan assembly 14 preferably includes the motorized impeller 52, described above, along with all the necessary electrical and mechanical components (not shown).

Preferably, the fan 18 is a reverse, curved impeller type fan, which is highly efficient, and is not typically susceptible to overloading. The fan 18 preferably includes a vibration isolation assembly 54 that mounts the fan to the fan support 16. The vibration isolation assembly 54 consists of a fan mounting plate and four isolators (not shown). The isolators act as cushions for the motorized impeller 52 portion of the fan 18 and absorbs vibration of the fan motor.

It is to be understood that the invention is not limited to the specific embodiment described above. Reasonable changes and new improvements to the invention may be made in the future. Consequently, the scope of the invention is to be limited solely by the following patent claims.

What is claimed is:

1. A fan filter unit, comprising:

a housing having a bottom opening;

a removable filter closing the opening;

a fan received in the housing;

a fan support received in the housing, the fan support having a horizontal section that is centrally located over the approximate midspan of the filter, and side supports sloping downwardly from opposite sides of the horizontal section, the sides cooperating to define a divergent chamber downwardly from the horizontal section toward the filter, and further, the fan is mounted to the support for drawing air into the chamber and forcing the air out through the filter, and wherein the fan filter unit is modular to allow the entire fan filter unit to be removed as a unit.

2. The fan filter unit of claim 1, wherein the fan is mounted to a lower surface of the horizontal section of the fan support, the horizontal section having an inlet opening for enabling the fan to draw air through the horizontal section, and further, the fan filter unit having an air cone received in the housing, the air cone being mounted to an upper surface of the horizontal section for delivering air into the inlet opening.

3. The fan filter unit of claim 2, wherein the fan is a variable frequency drive ("VFD") controlled fan, and further, the fan is adapted to draw air through the inlet opening of the horizontal section of the fan support, and force the air radially outwardly against the sloping sides of the fan support.

4. The fan filter unit of claim 3, including a power distribution box for controlling and adjusting the speed of the VFD controlled fan.

5. A fan filter unit, comprising:

a housing having a bottom opening;

a removable filter closing the opening;

a fan received in the housing;

a fan support received in the housing, the fan support having a horizontal section that is centrally located over the approximate midspan of the filter, and side supports sloping downwardly from opposite sides of the horizontal section, the sides cooperating to define a divergent chamber downwardly from the horizontal section toward the filter, and further, the fan is mounted to a lower surface of the horizontal section of the fan support for drawing air into the chamber and forcing the air out through the filter, the horizontal section having an inlet opening for enabling the fan to draw air through the horizontal section, and further, the fan filter unit having an air cone received in the housing, the air cone being mounted to an upper surface of the horizontal section for delivering air into the inlet opening.

6. The fan filter unit of claim 5, wherein the fan is a variable frequency drive ("VFD") controlled fan, and further, the fan is adapted to draw air through the inlet opening of the horizontal section of the fan support, and force the air radially outwardly against the sloping sides of the fan support.

7. The fan filter unit of claim 6, including a power distribution box for controlling and adjusting the speed of the VFD controlled fan.

8. The fan filter unit of claim 1, wherein the fan is mounted to a lower surface of the horizontal section of the fan support, the horizontal section having an inlet opening for enabling the fan to draw air through the horizontal section.

9. The fan filter unit of claim 1, further comprising an air cone received in the housing, the air cone being mounted to an upper surface of the horizontal section for delivering air to the fan.

10. The fan filter unit of claim 1, wherein the fan is a variable frequency drive ("VFD") controlled fan.

11. The fan filter unit of claim 1, wherein the fan is adapted to force the air radially outward against the sloping sides of the fan support.

12. The fan filter unit of claim 1, wherein the fan is a removable plug fan.

13. The fan filter unit of claim 4, wherein the power distribution box includes at least one output power connection whereby power can be provided to an adjacent fan filter unit.

14. The fan filter unit of claim 4, wherein the power distribution box includes at least one control signal output whereby control signals can be provided to an adjacent fan filter unit.

* * * * *